US008539092B2

(12) United States Patent
Hristodorescu et al.

(10) Patent No.: US 8,539,092 B2
(45) Date of Patent: Sep. 17, 2013

(54) VIDEO STREAMING USING MULTIPLE CHANNELS

(75) Inventors: Ionut Hristodorescu, San Jose, CA (US); Joe Abuan, San Jose, CA (US); James Oliver Normile, Los Altos, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 155 days.

(21) Appl. No.: 12/407,680

(22) Filed: Mar. 19, 2009

(65) Prior Publication Data
US 2010/0011117 A1 Jan. 14, 2010

Related U.S. Application Data

(60) Provisional application No. 61/079,373, filed on Jul. 9, 2008.

(51) Int. Cl.
*G06F 15/16* (2006.01)

(52) U.S. Cl.
USPC ............ 709/231; 709/203; 709/223; 709/232

(58) Field of Classification Search
USPC .................. 709/203, 231–232, 223
See application file for complete search history.

(56) References Cited

U.S. PATENT DOCUMENTS

| 6,023,456 | A | 2/2000 | Chapman et al. | |
|---|---|---|---|---|
| 7,020,195 | B1 * | 3/2006 | McMahon | 375/240.11 |
| 7,174,385 | B2 * | 2/2007 | Li | 709/231 |
| 7,664,109 | B2 | 2/2010 | Li | |
| 8,238,441 | B2 * | 8/2012 | Eshet et al. | 375/240.26 |
| 2002/0037037 | A1 * | 3/2002 | Van Der Schaar | 375/240.1 |
| 2003/0165274 | A1 * | 9/2003 | Haskell et al. | 382/243 |
| 2004/0196902 | A1 * | 10/2004 | Faroudja | 375/240.1 |
| 2005/0089035 | A1 | 4/2005 | Klemets et al. | |
| 2005/0114470 | A1 * | 5/2005 | Bal | 709/219 |
| 2005/0165911 | A1 | 7/2005 | Homiller | |
| 2005/0259748 | A1 * | 11/2005 | Payson et al. | 375/240.25 |
| 2006/0013309 | A1 * | 1/2006 | Ha et al. | 375/240.16 |
| 2006/0015634 | A1 * | 1/2006 | Gemmell | 709/231 |

(Continued)

FOREIGN PATENT DOCUMENTS

| CN | 1758646 A | 4/2006 |
|---|---|---|
| EP | 1 465 426 | 10/2004 |
| EP | 1 885 134 | 2/2008 |
| EP | 1 885 134 A1 | 2/2008 |

OTHER PUBLICATIONS

Andy Greenberg, Technology/Computer Software, "Brightcove Unleases a BitTorrent Stream", Forbes.com, Magazine Article, Oct. 9, 2007, website last viewed Mar. 15, 2009, http://www.forbes.com, one page.

(Continued)

*Primary Examiner* — Oanh Duong
(74) *Attorney, Agent, or Firm* — Kenyon & Kenyon LLP

(57) ABSTRACT

Systems and methods for streaming video over multiple HTTP channels are provided. The client may have control over the channels, allowing the client to control the amount and source of data received. Data requested by the client may be separated into a set of layers, with each layer being assigned to a separate channel. The client may adjust the number of layers requested based on a variety of factors. Layers may be requested from multiple remote sources, providing the client with additional control over the specific bandwidth profile of received data.

42 Claims, 3 Drawing Sheets

(56) References Cited

U.S. PATENT DOCUMENTS

| | | | | |
|---|---|---|---|---|
| 2006/0047779 | A1* | 3/2006 | Deshpande | 709/218 |
| 2006/0047824 | A1* | 3/2006 | Bowler | 709/229 |
| 2006/0156347 | A1 | 7/2006 | Zhang et al. | |
| 2006/0198300 | A1 | 9/2006 | Li et al. | |
| 2006/0224763 | A1* | 10/2006 | Altunbasak et al. | 709/231 |
| 2006/0235939 | A1 | 10/2006 | Yim | |
| 2007/0014349 | A1* | 1/2007 | Bao et al. | 375/240.1 |
| 2007/0177579 | A1* | 8/2007 | Diethorn et al. | 370/352 |
| 2008/0008455 | A1* | 1/2008 | De Lange et al. | 386/125 |
| 2008/0022005 | A1* | 1/2008 | Wu et al. | 709/231 |
| 2008/0130658 | A1 | 6/2008 | Chakareski et al. | |
| 2008/0181572 | A2* | 7/2008 | Kikkawa et al. | 386/46 |
| 2009/0141809 | A1* | 6/2009 | Visharam et al. | 375/240.25 |
| 2009/0252219 | A1* | 10/2009 | Chen et al. | 375/240.02 |

OTHER PUBLICATIONS

"Streaming Delivery Services", BitTorrent DNA, Copyright 2001-2009. BitTorrent, Inc., website last viewed Mar. 14, 2009, http://www.bittorent.com, 2 pages.

"BitTorrent's Delivery Network Accelerator (DNA) Service Improves the Online Experience for Streaming Video, Downloadable Software and Video Games", BitTorrent, Oct. 9, 2007, website last viewed Mar. 15, 2009, http://www.businesswire.com, 3 pages.

"Accelerate Your Downloads and Streams", BitTorrent DNA, Copyright 2001-2009. BitTorrent, Inc., website last viewed Mar. 14, 2009, http://www.bittorent.com, 4 pages.

Mike Fisk and Wu-Chun Feng, "Dynamic Right-Sizing in TCP", Los Alamos National Laboratory, Department of Computer & Information Science, The Ohio State University, Proc. of the Los Alamos Computer Science Institute Symposium, Oct. 2001, LA-UR 01-5460, pp. 1-7.

Bing Wang, Jim Kurose, Prashant Shenoy and Don Towsley, "Multimedia Streaming via TCP: An Analytic Performance Study", ACM Journal Name, vol. V, No. N, Month 20YY, pp. 1-24.

Reza Rejaie, Mark Handley and Deborah Estrin, "Layered Quality Adaptation for Internet Video Streaming", IEEE Journal on selected areas in communications, vol. 18, No. 12, Dec. 2000, pp. 2530-2543.

International Search Report, mailed Feb. 25, 2010, from corresponding International Application No. PCT/US2009/050053.

Margharei et al., "Adaptive Receiver-Driven Streaming from Multiple Senders," Multimedia Systems, 11(6): 550-567 (2006).

Matsuoka et al., "Problem Statement and Requirements for Multi-Link Transport," Internet Draft dated Oct. 20, 2004, Internet Engineering Task Force (IETF): Work-In-Progress.

Wu et al., "Streaming Video over the Internet: Approaches and Directions," IEEE Transactions on Circuits and Systems for Video Technology, 11(3): 282-300 (2001).

Ramaprabhu Janakiraman, Lihao Xu; "Layered Priority Encoded Transmission for Video Streaming to Heterogeneous Clients"; Department of Computer Science and Engineering, Washington University in St. Louis, MO; ISIT 2004, Chicago, USA, Jun. 27-Jul. 2, 2004; 0-7803-8280-3/04/$20.00; Copyright 2004 IEEE; p. 331.

Office Action issued for corresponding Chinese Application No. 200980126262.X on Aug. 3, 2012, English translation.

Magharei et al., "Adaptive Receiver-Driven Streaming From Multiple Senders", Multimedia Systems (2006); Department of Computer and Information Science, University of Oregon, OR, USA; Springer-Verlag, Apr. 25, 2006; pp. 550-567.

* cited by examiner

VIDEO STREAMING USING MULTIPLE CHANNELS

The present application claims the benefit of U.S. Provisional application, Ser. No. 61/079,373, filed Jul. 9, 2008, entitled "Video Streaming Using Multiple Channels." The disclosure of this application is incorporated herein by reference in its entirety.

BACKGROUND

The hypertext transfer protocol (HTTP) is a request/response protocol used to send data, most often text and images, from a server to a client. In conventional operation, an HTTP client sends, over the Transmission Control Protocol (TCP), a request for a specific resource to a server. The server processes the request and returns a response that includes a status or error message and, if available, the requested resource. Conventional HTTP communication sessions include a single channel between a server and a client to transmit data between the two. The channel can be used for multiple requests.

An HTTP connection can be used to transmit a variety of data from a server to a client. When an HTTP session is used to stream video or other data that is sensitive to delays in transmission or bandwidth available to the client, the client may receive delayed or incomplete video data. Generally, the backoff and retransmission mechanisms built into TCP can lead to undesirable delays that violate the timeliness requirement for streaming media. The client also may be required to buffer a considerable amount of video data before presenting the video to a user at an acceptable quality, in order to mitigate later-occurring effects such as communication delays or changes in available bandwidth.

The connectivity issues may be exacerbated given that the stream is usually received over a single channel, such structure also generally precluding the possibility of scaling or shaping the video transmission on-the-fly. Further, where on-the-fly scaling and transmission controls are implemented, they are generally server-side, and the client essentially takes what it can get.

Accordingly, it would be desirable to mitigate some of the transmission errors and delays currently inherent in video streaming by coordinating the stream between multiple HTTP channels, and shifting control of the stream from the servers to the clients.

DETAILED DESCRIPTION

Figure 1:
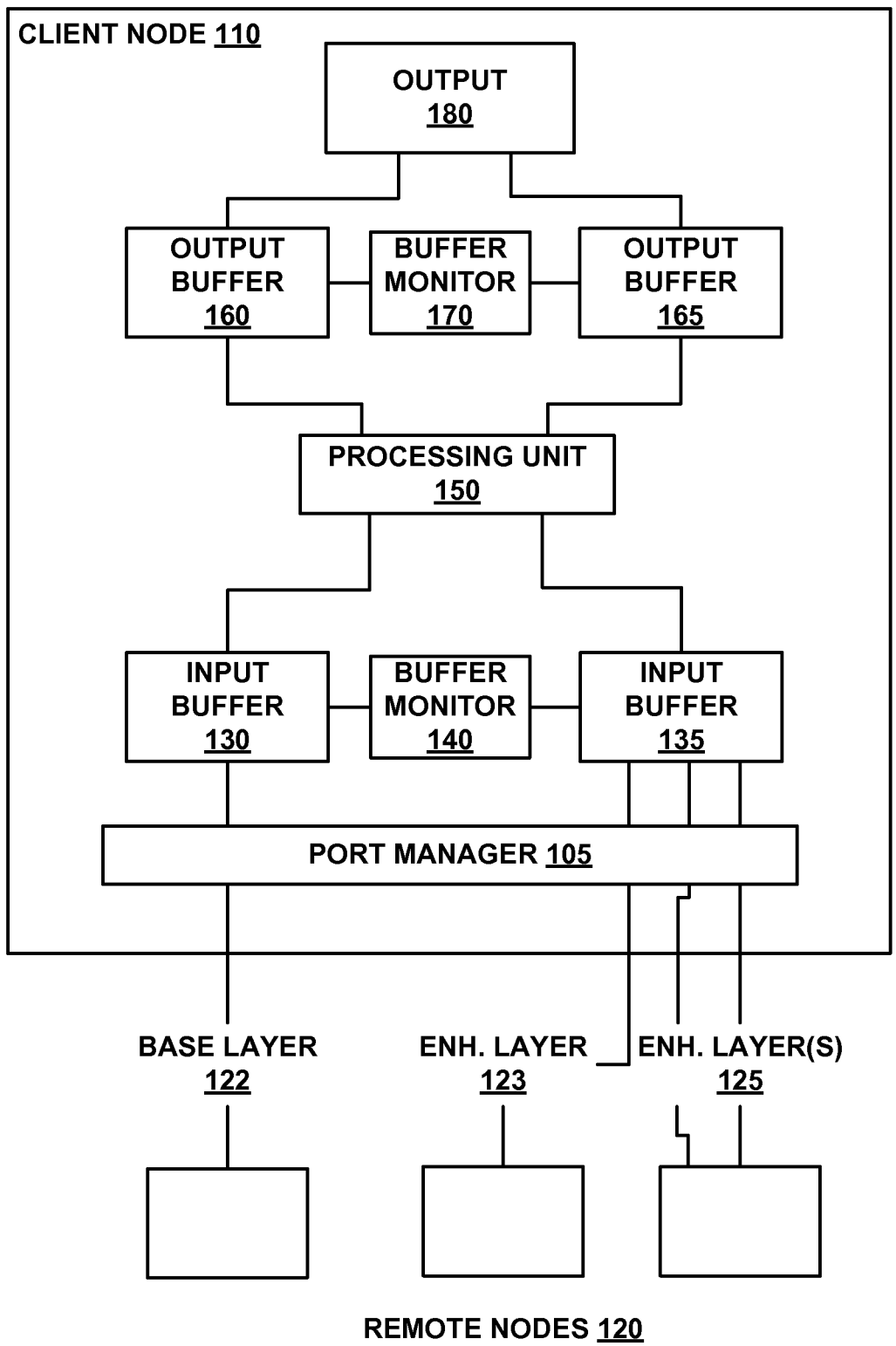
FIG. 1 is a simplified block diagram illustrating how multi-channel HTTP streaming may be employed according to an embodiment of the invention.

Detailed descriptions of one or more embodiments of the invention follow, examples of which may be graphically illustrated in the drawings. Each example and embodiment is provided by way of explanation of the invention, and is not meant as a limitation of the invention. For example, features described as part of one embodiment may be utilized with another embodiment to yield still a further embodiment. It is intended that the present invention include these and other modifications and variations.

Systems and methods for streaming video over multiple HTTP channels are provided. The client may have control over multiple channels (each associated with a distinct client port), allowing the client to control the amount and source of data received. Data requested by the client may be separated into a set of layers, with each layer being assigned to a separate channel. The client may adjust the number of layers requested based on a variety of factors. For example, as the client's available bandwidth changes, the client can drop or request additional layers. Layers may be requested from multiple remote sources, providing the client with additional control over the specific bandwidth profile of received data.

Embodiments of the invention may allow a client to more fully control the amount and quality of streaming video received. After requesting an initial base layer of streaming video, the client may open additional channels to request enhancement layers that provide increased quality or quantity of video. As the client encounters environmental changes such as increased or decreased processing power or bandwidth, fewer or more enhancement layers may be requested. The client may decode the base layer and as many enhancement layers as are received and may generate a recovered video signal therefrom. The recovered video signal may be output to a display device or stored for later use at the client.

Throughout this disclosure, reference is made to a "channel," which may be defined as a single HTTP connection over an Internet socket. As is known, an Internet socket is generally composed of the protocol used (e.g., TCP, etc.), a local Internet Protocol (IP) address (i.e., the client's IP address), a port on the client machine, a remote IP address, and a port on the remote machine.

FIG. 1 is a simplified functional block diagram illustrating a system for receiving video data over multiple channels. A client node 110 may connect to one or more remote nodes 120. Each remote node may be a server, such as a content server, or it may be a peer of the client node. The client node may receive a base layer 122 of a video stream from a remote node. Typically, the base layer includes a minimum amount of data sufficient to decode and/or provide audio/video content to a user of the client node. For example, a base layer may include video data encoded at a minimum resolution, audio data encoded at a minimum bitrate, an initial portion of a video, and/or other data sufficient to provide a base quality or quantity of content.

The client node also may receive one or more enhancement layers 123, 125 from a remote node. Enhancement layers may provide additional data to the client node that can be incorporated with the base layer to increase the quality and/or quantity of the video data.

Each layer received by the client node may be received over a single channel between the client node and a remote node. The ports associated with each channel may be those ports having generally standardized functions and those that are generally allocated dynamically. For example, a layer may be received over a channel comprising a remote node's TCP port 80, which is typically reserved for HTTP data, and any of the client node's port numbers other than 0-1023, which are generally reserved by the operating system and various applications. Other TCP ports may be used. Typically, each layer is received over a separate port, though a specific port may be used to receive a first layer during one time domain, and a second layer during another time domain (i.e., a particular layer is not mapped—beyond a session—to a particular port). Each layer may be provided by a separate remote node, or a single remote node may provide multiple layers. For example, where the remote node is a content server, the content server may provide each layer to a client node as the layers are requested by the client node (i.e., the client node may not need to use multiple remote nodes to satisfy its requirements, but can instead establish multiple channels to a single remote node capable of providing the requested data).

To manage reception of video data over multiple channels, the client node may include a port manager 105. The port manager can allow the client node to receive additional video layers by opening connections to additional remote nodes, and can disable the reception of layers by closing the ports over which those layers are received, effectively stopping communication with the remote nodes (over at least those particular ports).

The client node may manage received layers using a variety of criteria. For example, the client node may monitor the network bandwidth available to the client node; when additional bandwidth is available, the client node may request additional enhancement layers. If the client node experiences reduced bandwidth, enhancement layers may be dropped by closing the ports over which the layers are received. The client node also may request and drop enhancement layers based on input received from a user of the client node, such as where a user indicates that a higher resolution of a video stream is desired, or that he would now like to see closed-captioning information.

The client node also may adjust the number of requested layers based on how efficiently the client node is able to process the layers. For example, the video stream may require decoding by the client node before presentation to a user, such as where the video stream is compressed to reduce transmission bandwidth. The client node may include a processing unit 150 to decode or perform other processing of the received video stream. Data received from remote nodes may be initially processed by one or more input buffers 130, 135. In an embodiment, the base layer may be processed by a first input butter 130 and enhancement layers processed by a second input buffer 135. Multiple input buffers may be used for the enhancement layers. It will be appreciated that the number of input buffers and their association with a layer or layers may vary widely between embodiments, and that these permutations and combinations are not critical to the invention.

The processing unit may transmit processed video data to one or more output buffers 160, 165. The output buffers may receive post-processing video data and configure it for the output 180. For example, where the processing unit 150 provides decoded data faster than is required for display by the client node, the output buffers may store the decoded data and provide it at a rate appropriate for display by an output device 180. Separate output buffers may be used for the base layer and for enhancement layers, if present. Multiple output buffers may be used for the enhancement layers. As with the input buffers, it will be appreciated that the number of output buffers and their association with a layer or layers may vary widely between embodiments, and that these permutations and combinations are not critical to the invention. The output 180 may be any appropriate display or interface, such as a television, monitor, projection screen, or other device.

The client node may include buffer monitors 140, 170 to track the progress of the various layers through the system. Depending on the amount and speed of data being processed, the client node may adjust the layers requested from remote nodes. For example, where too much data is received or data is received too quickly at the input buffers, the client node may drop one or more enhancement layers. Similarly, if the processing unit can successfully process more data (i.e., the input buffers are storing little data), the client node may request one or more additional layers. The client node also may adjust the number of layers requested based on data from a buffer monitor 170 that tracks the relationship between processed data and output data. For example, if the output buffers are storing a large amount of data, such as where they may be nearing capacity, the client node may drop one or more enhancement layers. If the output buffers are storing a relatively small amount of data over time, the client node may request additional enhancement layers.

Figure 2:
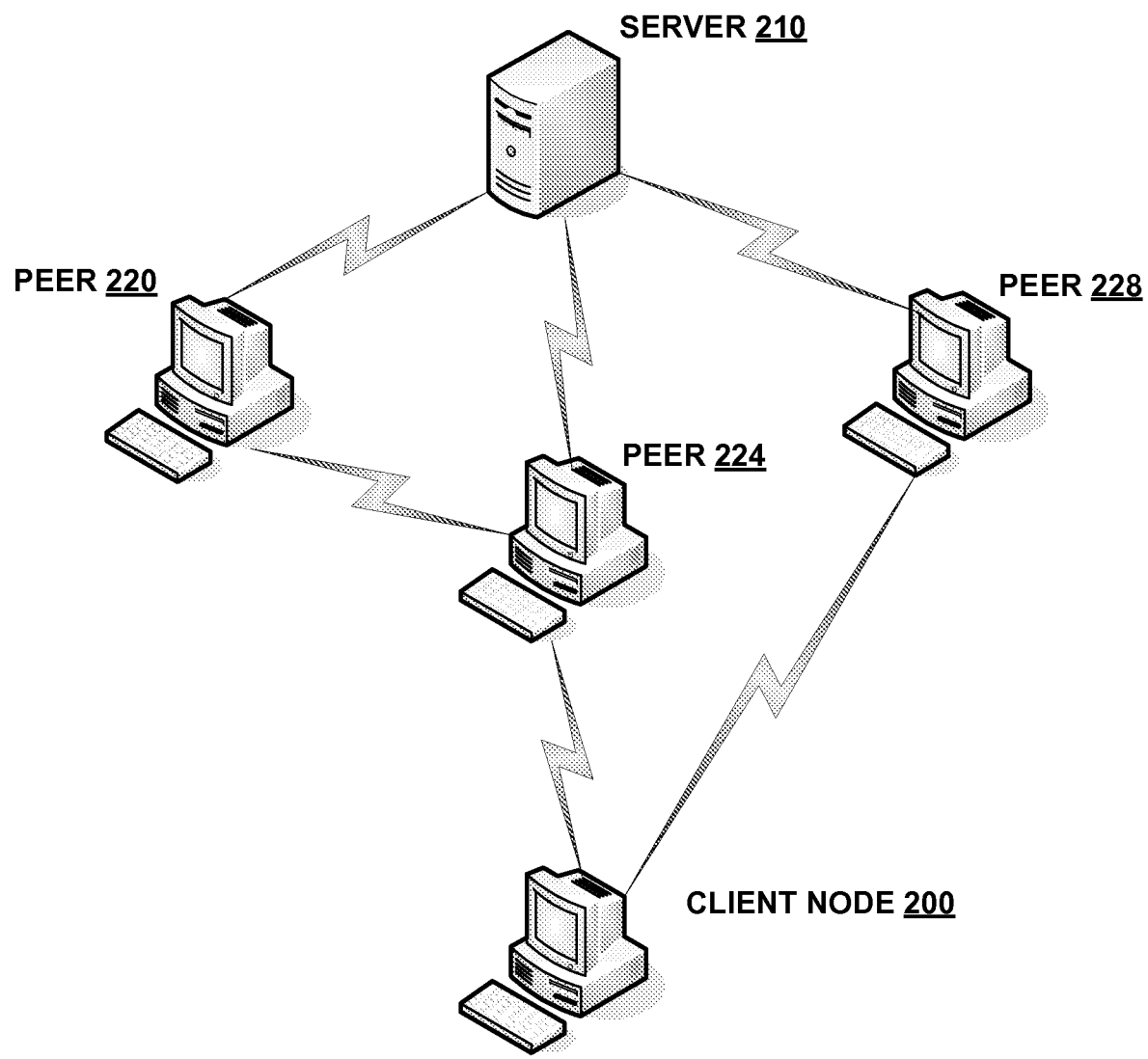
FIG. 2 illustrates a client node in connection with remote nodes.

A client node may request streaming video layers from a variety of remote nodes. In an embodiment, the remote nodes from which a client node requests streaming video layers may be network peers. FIG. 2 shows a client node 200 in a communication network. The network may include one or more servers 210 to provide content such as streaming video. In some cases, the client node may not be able to communicate directly with the server, or it may be more efficient to communicate with peer client nodes 220, 224, 228 on the network than directly with the server 210. In this configuration, the client node may identify and request streaming video layers from servers, peer nodes, or both. The client node may select remote nodes from which to request layers based on a variety of factors, such as available bandwidth between the client node and the remote nodes, communication latency between the various remote nodes, or the physical geography of the remote nodes. Different criteria may be applied to different layers. For example, the client node may request a base layer from the first remote node to respond to a series of requests sent to multiple remote nodes, so that the client node can begin processing the base layer as soon as possible. Similarly, the client node may request enhancement layers from the available remote nodes that are best suited to deliver them, such as where the enhancement layers are known to have much larger bandwidth requirements than the base layer. Depending on various factors affecting a remote node (e.g., available bandwidth, latency, processor load, etc.), the remote node may respond to a client node's request to create and deliver a layer in a various ways. For example, if the remote node determines it is capable of delivering the layer as requested, it may do so. However, if the remote node determines it cannot provide the layer as requested, for example due to loading or bandwidth limitations, it may refuse the request and not provide a layer at all. Alternatively, the remote node may provide a layer of a smaller size than requested, which typically involves compression at lower quality. Similarly, if the remote node determines that it is permissible to deliver a layer of larger size than requested by the client node, which typically involves higher quality coding, it may attempt to do so. In any case, the client node may accept or reject a layer provided by the remote node.

Figure 3:
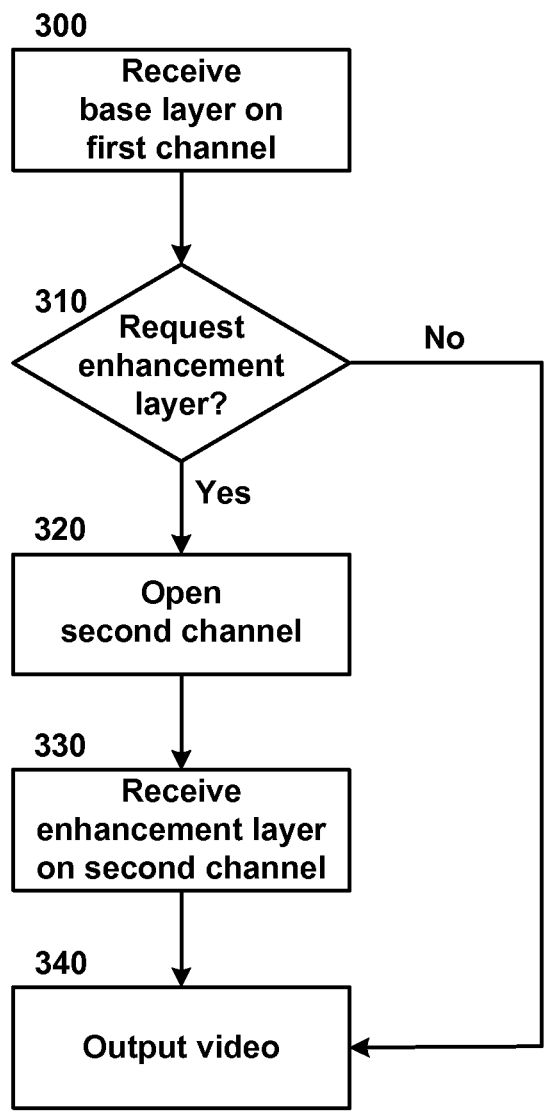
FIG. 3 is a flow diagram of multi-channel HTTP streaming according to an embodiment of the invention.

FIG. 3 is a flow diagram of multi-channel HTTP streaming according to an embodiment of the invention. At block 300, a client node begins receiving a base layer of video on a first channel established between the client node and a first remote node. Depending on various factors, such as, for example, network conditions as monitored by the client node, the client node determines whether it can handle the reception of an enhancement layer, as shown at block 310. If no, the client node continues receiving just the base layer and ultimately outputs the received video to an appropriate display or interface, as illustrated by block 340. If the client node determines that it can receive an enhancement layer, a port manager at the client node opens a port on the client node and a second channel is established between the client node and a second remote node, as shown at block 320. At block 330, the client node receives both the base layer and the enhancement layer, each on a separate channel. The base layer and the enhancement layer are decoded, and the recovered video is output to an appropriate display or interface, as illustrated by block 340.

Each client node may manage and monitor its own network conditions, so that the remote nodes may not need to be aware of how much data each client node can accept. For example, a client node that has a large amount of bandwidth relative to other client nodes may request a base layer and several enhancement layers, while a client node with a relatively small amount of bandwidth might request only the base layer or fewer enhancement layers. Thus, each client node is able to manage its own network resources, and the remote node can remain effectively ignorant of what the client node's capabilities and requirements are, other than that the client node needs the particular layer currently being requested.

Similarly, and in addition to monitoring network conditions, the client node may monitor its power conditions, and use such conditions, either alone or together with network conditions, to determine what and how much data the client node can accept. For example, if a client node is implemented in a mobile device subject to various and shifting power constraints (e.g., a discharging battery), the client node may choose to receive only a base layer; however, if the client node begins receiving constant power (e.g., from a power supply plugged into an electrical outlet), it may request to receive one or more enhancement layers.

The client node also may use various information about the video stream (i.e., metadata), which may be supplied together with a layer of the video stream or over a separate, independent channel, to determine which enhancement layers to request and when to request them. For example, the metadata may describe, or otherwise make known to the client node, an upcoming portion of the video that would be well served by one or more enhancement layers, and such sections may be "pre-loaded" so that they are available to the client node when playback of the video reaches the subject portion.

The multi-layer, multi-channel streaming techniques and their control by the client node as described herein, may allow for delivery methods not available using conventional techniques. For example, video content may be provided or sold in different qualities and through different mediums. In this configuration, the base layer may be provided at an initial cost or for no cost, and additional enhancement layers offered for additional cost. Thus, a user could instruct the client node to receive only the base layer initially, and if the user wishes to receive a higher-quality version of the streamed content, one or more enhancement layers may be requested, possibly for additional cost. Thus, each user or client node can select the quality level appropriate for the viewing device, user desires, or other constraint.

For example, the base layer may be sold on an optical disc (e.g., a DVD) or other medium, and the user of the client node may be given the option to view enhancement layers for additional cost. Such an implementation may be advantageous to a user who wishes to watch the majority of a movie at only a base-layer quality, but who wants to receive at least part of the movie at an enhanced quality (which may be more expensive). It will be appreciated that in such a configuration, the base layer, received from, for example, a DVD, may not reach the processing unit via the port manager, but rather by way of some other communication mechanism adapted for the particular medium.

As described herein, the client node communicates with remote nodes using multiple channels, and this configuration may provide advantages over both other protocols and conventional single-channel HTTP streaming techniques. The use of HTTP may simplify client node design, since it is a common and well-utilized protocol. It may also provide enhanced control for client nodes when compared to conventional streaming techniques that use a single channel for communications and thus force requests and responses to occur in series. In contrast, the multi-channel streaming systems and methods described herein allow multiple layers to be requested and managed in parallel, providing greater flexibility to the client node.

Multi-channel HTTP streaming as described herein, including the shifting of much of the control of the stream(s) to the client node, shall not hinder a remote node's ability to dynamically load-balance the bandwidth used by the remote node. For example, if many client nodes are requesting enhancement layers and the resulting total bandwidth used to provide the enhancement layers is undesirable, the remote node may block some of the enhancement layers and force some or all users to connect at a lower bandwidth cost. The remote node may allow some clients to use enhancement layers and restrict other client nodes to base layers, or client nodes may be allotted a specific amount of bandwidth and restricted to base and enhancement layers that can fit in the allotted bandwidth. Other techniques and algorithms may be used.

The various computer systems described herein may each include a storage component for storing machine-readable instructions for performing the various processes as described and illustrated. The storage component may be any type of machine-readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer-readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

The sequence and numbering of blocks depicted in FIG. 3 is not intended to imply an order of operations to the exclusion of other possibilities. Although the present invention has been described with reference to particular examples and embodiments, it is understood that the present invention is not limited to those examples and embodiments. The present invention as claimed therefore includes variations from the specific examples and embodiments described herein, as will be apparent to one of skill in the art.

What is claimed is:

1. A video decoder, comprising:
a port manager configured to manage reception of a video data stream and to manage separately communication ports for reception of a base layer of the video data stream and for reception of an enhancement layer of the video data stream, and to assign a first port of the ports for the reception of the base layer, and assign a second port of the ports for the reception of the enhancement layer upon determining the video decoder is to receive the enhancement layer, wherein the base layer is assigned to the first port and the enhancement layer is assigned to the second port until the reception of the video data stream is complete, wherein the ports are managed in parallel;

a plurality of input buffers, each of the input buffers receives the base layer or the enhancement layer of the video data stream;
a processing unit to decode the base layer of the video data stream and the enhancement layer of the video data stream and generate recovered video therefrom; and
an output interface to provide the recovered video to a user.

2. The video decoder of claim 1, wherein the video decoder dynamically requisitions enhancement layers from a remote source according to operating conditions at the video decoder and opens ports corresponding to granted requisitions.

3. The video decoder of claim 1, wherein the first port and the second port are configured to receive data transferred in a hypertext transfer protocol.

4. The video decoder of claim 1, wherein the base layer and the first enhancement layer are transferred over a hypertext transfer protocol connection.

5. The video decoder of claim 1, wherein
the port manager is further configured to manage a third port to receive a second enhancement layer of video data, and
the processing unit is to generate recovered video also from the second enhancement layer of video data.

6. The video decoder of claim 1, wherein each of the first port and the second port is configured to connect to a content server.

7. The video decoder of claim 1, wherein at least one of the first port and the second port is configured to connect to a network peer.

8. The video decoder of claim 1, further comprising an input buffer monitor to track the status of the base layer of video data while in the input buffer.

9. The video decoder of claim 1, further comprising an output buffer to receive the recovered video before it is sent to the output interface.

10. The video decoder of claim 9, further comprising an output buffer monitor to track the status of the recovered video while in the output buffer.

11. The video decoder of claim 1 wherein said port manager is further configured to close the second port upon a determination to disable the reception of the enhancement layer.

12. The video decoder of claim 1, wherein the video decoder dynamically requisitions enhancement layers from a remote source in response to information in metadata of the video data.

13. The video decoder of claim 1, wherein the port manager is configured to manage the reception of video data by managing the operation of the ports.

14. A video decoder, comprising:
a port manager configured to manage reception of a video data stream and to manage separately communication ports for reception of a plurality of enhancement layers of the video data stream, and to assign the communication ports for reception of the enhancement layers upon determining the video decoder is to receive the enhancement layers, wherein each of the enhancement layers is assigned to each of the communications ports until the reception of the video data stream is complete, wherein the communication ports are managed in parallel;
a plurality of input buffers, each of the input buffers receives one of the enhancement layers or a base layer of the video data stream wherein the base layer is received from local storage;
a processing unit to generate recovered video from the base layer of the video data stream and the enhancement layers of the video data stream; and
an output interface to provide the recovered video to a user.

15. The video decoder of claim 14, wherein the local storage is selected from the group consisting of:
an optical disc;
a hard disk drive; and
a random access memory.

16. A method, comprising:
assigning a first port at a client node for reception of a base layer of a video stream;
at the client node, receiving the base layer over the first port from a first remote node;
responsive to a determination by the client node that the client node receive a first enhancement layer of the video stream, assigning a second port at the client node for reception of the first enhancement layer and requesting the first enhancement layer from a second remote node, wherein the first and second ports are managed in parallel;
at the client node, receiving the first enhancement layer of the video stream over the second port from the second remote node;
wherein the base layer is assigned to the first port and the enhancement layer is assigned to the second port until reception of the video stream is complete; and
providing a recovered video stream generated from the base layer and the first enhancement layer to an output.

17. The method of claim 16, wherein the base layer and the first enhancement layer are received over a hypertext transfer protocol connection.

18. The method of claim 16, wherein the first remote node and the second remote node are the same node.

19. The method of claim 16, wherein at least one of the first remote node and the second remote node is a peer of the client node.

20. The method of claim 16, further comprising:
responsive to a determination by the client node that the client node receive a second enhancement layer of the video stream, requesting the second enhancement layer from a third remote node;
at the client node, receiving the second enhancement layer of the video stream over a third port from the third remote node; and
providing a recovered video stream generated from the base layer, the first enhancement layer, and the second enhancement layer to the output.

21. The method of claim 16, wherein the determination by the client node that the client node receive the first enhancement layer is informed by a network status of the client node.

22. The method of claim 16, wherein the determination by the client node that the client node receive the first enhancement layer is informed by a power status of the client node.

23. The method of claim 16, wherein the determination by the client node that the client node receive the first enhancement layer is informed by a status of an input buffer.

24. The method of claim 16, wherein the determination by the client node that the client node receive the first enhancement layer is informed by a status of an output buffer.

25. The method of claim 16, wherein the determination by the client node that the client node receive the first enhancement layer is informed by an input of a user of the client node.

26. The method of claim 16, wherein the first remote node and the second remote node are different nodes.

27. A method, comprising:
at a client node, receiving a base layer of a video stream from a local source;
responsive to a determination by the client node that the client node receive a plurality of enhancement layers of the video stream, assigning each port at the client node for reception of each of the enhancement layers and requesting the enhancement layers from a remote node;

at the client node, receiving said each of the enhancement layers of the video stream over said each port from the remote node, wherein the enhancement layers are managed at the client node in parallel;

wherein said each of the enhancement layers is assigned to said each port until reception of the video stream is complete; and providing a recovered video stream generated from the base layer and the enhancement layers to an output.

28. The method of claim 27, wherein the local source is selected from the group consisting of:
an optical disc;
a hard disk drive; and
a random access memory.

29. The method of claim 27, wherein the output is a display.

30. A non-transitory computer-readable medium encoded with a computer-executable program to perform a method comprising:

assigning a first port at a client node for reception of a base layer of a video stream;

at the client node, receiving the base layer over the first port from a first remote node;

responsive to a determination by the client node that the client node receives a first enhancement layer of the video stream, assigning a second port at the client node for reception of the first enhancement layer and requesting the first enhancement layer from a second remote node, wherein the first and second ports are managed in parallel;

at the client node, receiving the first enhancement layer of the video stream over the second port from the second remote node;

wherein the base layer is assigned to the first port and the enhancement layer is assigned to the second port until reception of the video stream is complete; and providing a recovered video stream generated from the base layer and the first enhancement layer to an output.

31. The computer-readable medium of claim 30, wherein the base layer and the first enhancement layer are received over a hypertext transfer protocol connection.

32. The computer-readable medium of claim 30, wherein the first remote node and the second remote node are the same node.

33. The computer-readable medium of claim 30, wherein at least one of the first remote node and the second remote node is a peer of the client node.

34. The computer-readable medium of claim 30, further comprising:

responsive to a determination by the client node that the client node receive a second enhancement layer of the video stream, requesting the second enhancement layer from a third remote node;

at the client node, receiving the second enhancement layer of the video stream over a third port from the third remote node; and providing a recovered video stream generated from the base layer, the first enhancement layer, and the second enhancement layer to the output.

35. The computer-readable medium of claim 30, wherein the determination by the client node that the client node receive the first enhancement layer is informed by a network status of the client node.

36. The computer-readable medium of claim 30, wherein the determination by the client node that the client node receive the first enhancement layer is informed by a power status of the client node.

37. The computer-readable medium of claim 30, wherein the determination by the client node that the client node receive the first enhancement layer is informed by a status of an input buffer.

38. The computer-readable medium of claim 30, wherein the determination by the client node that the client node receive the first enhancement layer is informed by a status of an output buffer.

39. The computer-readable medium of claim 30, wherein the determination by the client node that the client node receive the first enhancement layer is informed by an input of a user of the client node.

40. A non-transitory computer-readable medium encoded with a computer-executable program to perform a method comprising:

at a client node, receiving a base layer of a video stream from a local source;

responsive to a determination by the client node that the client node receives a plurality of enhancement layers of the video stream, assigning each port at the client node for reception of each of the enhancement layers and requesting said each of enhancement layers from a remote node;

at the client node, receiving said each of enhancement layers of the video stream over each port from the remote node, wherein the enhancement layers are managed at the client node in parallel;

wherein said each of the enhancement layers is assigned to said each port until reception of the video stream is complete; and providing a recovered video stream generated from the base layer and the enhancement layers to an output.

41. The computer-readable medium of claim 40, wherein the local source is selected from the group consisting of:
an optical disc;
a hard disk drive; and
a random access memory.

42. A video decoder, comprising:

a port manager configured to manage reception of a video data stream and to manage a first TCP port for reception of a base layer of the video data stream and a second TCP port for reception of an enhancement layer of the video data stream, and to assign the first TCP port for the reception of the base layer, and assign the second TCP port for the reception of the enhancement layer upon determining the video decoder is to receive the enhancement layer, wherein the base layer is assigned to the first TCP port and the enhancement layer is assigned to the second TCP port until the reception of the video data stream is complete, wherein the first and second TCP ports are managed in parallel;

a plurality of input buffers, each of the input buffers receives the base layer or the enhancement layer of the video data stream;

a processing unit to decode the base layer of the video data stream and the enhancement layer of the video data stream and generate recovered video therefrom; and an output interface to provide the recovered video to a user.

* * * * *